United States Patent
Hundscheidt et al.

(10) Patent No.: US 7,944,873 B2
(45) Date of Patent: May 17, 2011

(54) METHOD AND SYSTEM FOR ACCESS AND ACCOUNTING OF POINT-TO-MULTIPOINT SERVICES

(75) Inventors: Frank Hundscheidt, Kerkrade (NL); Thorsten Lohmar, Aachen (DE); Ralf Keller, Würselen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1314 days.

(21) Appl. No.: 10/507,353

(22) PCT Filed: Feb. 27, 2003

(86) PCT No.: PCT/EP03/02013
§ 371 (c)(1), (2), (4) Date: Sep. 10, 2004

(87) PCT Pub. No.: WO03/077528
PCT Pub. Date: Sep. 18, 2003

(65) Prior Publication Data
US 2005/0176404 A1    Aug. 11, 2005

(30) Foreign Application Priority Data
Mar. 14, 2002   (EP) .................... 02005872

(51) Int. Cl.
 H04B 7/00   (2006.01)
 H04B 1/00   (2006.01)
 H04W 4/00   (2009.01)
 H04M 11/00  (2006.01)
 H04M 15/00  (2006.01)

(52) U.S. Cl. ............ 370/328; 370/310; 370/338; 455/406; 455/466; 455/519; 455/61; 379/114.06; 379/114.08; 705/34

(58) Field of Classification Search ............. 370/310, 370/328, 338; 455/406, 466, 519, 61; 379/114.06, 379/114.08; 705/34
See application file for complete search history.

(56) References Cited

U.S. PATENT DOCUMENTS 5,012,466 A * 4/1991 Buhrke et al. .............. 370/270
6,047,051 A   4/2000 Antti et al.

(Continued)

FOREIGN PATENT DOCUMENTS

JP    A-H03-062646    3/1991

(Continued)

OTHER PUBLICATIONS

Herzog S et al, "Sharing the Cost of Multicast Trees: An Axiomatic Analysis", IEEE/ACM Transactions on Netwroking IEEE Inc. New York, US, vol. 5, NR. 6, pp. 847-859 XP000734412 ISSN: 1063-6692.

(Continued)

Primary Examiner—Ariel Balaoing (57) ABSTRACT

The present application relates to a method for managing point-to-multi-point services in a mobile communication network, comprising: receiving from a mobile station a request for accessing a point-to-multipoint service, storing a subscriber identification in association with a point-to-multi-point service identification, performing an access enabling procedure, and providing accounting information to an accounting entity of the mobile communication network, where said accounting information identifies the subscriber who placed the request together with the point-to-multipoint service for which access was requested.

21 Claims, 8 Drawing Sheets

U.S. PATENT DOCUMENTS

| | | | |
|---|---|---|---|
| 2001/0041556 A1* | 11/2001 | Laursen et al. | 455/406 |
| 2002/0089985 A1* | 7/2002 | Wahl et al. | 370/395.1 |
| 2002/0102967 A1* | 8/2002 | Chang et al. | 455/414 |
| 2002/0151321 A1* | 10/2002 | Winchell et al. | 455/519 |
| 2005/0286488 A1* | 12/2005 | Briscoe et al. | 370/351 |

FOREIGN PATENT DOCUMENTS

| | | |
|---|---|---|
| JP | A H09-321915 | 12/1997 |
| JP | A 2001-077773 | 3/2001 |
| WO | WO-99/52304 | 10/1999 |
| WO | WO 0143390 | 6/2001 |
| WO | WO 0143390 A | 6/2001 |

OTHER PUBLICATIONS

Universal Mobile Telecommunication System (UMTS); Multimedia Broadcast/Multicast Service (MBMS); Stage 1 (3GPP TS 22.146 version 5.2.0 Release 5) 3GPP TS 122 146 V5 2.0 Rel. 5, Mar. 1, 2002, pp. 1-15, XP002208067.

European Patent Office, International Search Report for PCT/EP03/02013, May 2, 2003.

Herzog, S., et al., "Sharng the Cost of Multicast Trees: An Axiomatic Analysis;" IEEE/ACM Transactions on Networking, IEEE, Inc., New York, USA, vol. 5, NR. 6, pp. 847-859; XP000734412; ISSN: 1063-66925.

* cited by examiner

METHOD AND SYSTEM FOR ACCESS AND ACCOUNTING OF POINT-TO-MULTIPOINT SERVICES

FIELD OF THE INVENTION

The present application relates to a method of managing point-to-multipoint services in a mobile communication network.

BACKGROUND OF THE INVENTION

In the context of mobile communication systems, it has been suggested to introduce point-to-multipoint (PTM) services, see e.g. Technical Specification 3GPP TS 22.146 V5 1.0 (December 2001), which technical specification is herewith incorporated by reference. In this technical specification two basic types of PTM services are described, namely multicast and broadcast. Both multicast and broadcast have in common that a single source transmits data or data units to several destinations. In accordance with the above-mentioned technical specification TS 22.146, the broadcast mode is a unidirectional point-to-multipoint transmission of data from a single source entity to all users in a broadcast area or areas. The multicast mode allows the unidirectional point-to-multipoint transmission of data from a single source point to a multicast group in a multicast area. In other words, in a multicast transmission, data is only sent to the members who have joined the corresponding multicast group, whereas a broadcast transmission can be received by anyone within a predetermined (logical or physical) area.

Regarding charging or billing, the TS 22.146 only mentions that it should be possible to collect charging information for the use of broadcast services and multicast services. However, it is not indicated how this can be done.

Object of the Present Invention

The object of the present invention is to provide a method of managing point-to-multipoint services in a mobile communication network, which method enables correct and secure accounting for individual users and service providers of PTM services.

SUMMARY OF THE INVENTION

In accordance with the present invention, this object is solved by a method described in claim 1, and by network entities described in claims 19 and 20. Advantageous embodiments are described in the dependent claims.

In accordance with the method of the invention, a PTM service managing entity of the mobile communication network receives a request for accessing a PTM service from a subscriber, which request identifies the subscriber and the desired PTM service. The subscriber identification and a PTM service identification are stored in association with one another. Furthermore, an access enabling procedure is performed, and accounting information is provided to an accounting entity of the mobile communication network, where the accounting information identifies the subscriber who placed the request and the desired PTM service.

It should be noted that the term "accounting" is used to describe the action of keeping an account for a given party, such as for a subscriber or for a service provider, in which account funds are debited (i.e. charging or billing) or credited (i.e. payment).

The term "accessing a PTM service" means that the PTM service can be received and its contents can be properly reproduced. For example, in the case of a multicast service transmitted without encryption, this can mean simply receiving the transmissions, and in the event of a broadcast service with encryption, it can mean receiving the transmissions of the service and being able to decrypt them.

Due to the fact that a user or subscriber (it may be noted that the term "subscriber" relates to any subscriber capable of interacting with the mobile communication network under consideration, i.e. a home subscriber or visiting subscriber) must first send a request, and an identification of the requesting subscriber is stored in association with an identification of the requested PTM service, it is ensured that proper accounting for the given PTM service will take place, e.g. it can be ensured that the accessing subscribers pay for the service if it is a service that requires payment. Furthermore, due to the fact that a subscriber identification is stored for each requesting subscriber, accounting can be performed for the individual subscribers, e.g. each subscriber can be billed or charged individually.

According to a preferred embodiment, the number of subscribers associated with a given PTM service is also provided as accounting information. Thereby, an accounting entity in the network can perform its accounting on the basis of the indicated number of subscribers.

It may be noted that the indicated number of subscribers can be all of the subscriber associated with the given PTM service, or a predetermined part thereof, e.g. the subscribers associated with the given PTM service who are located in a predetermined area. Preferably, if the accounting comprises charging or billing, then the indicated number is used in such a way that the billing tariff decreases with an increasing indicated number of subscribers. Thereby, the billing for the service operates according to the principle of "less expensive if successful". This is especially advantageous when billing the provider of the PTM service. However, the accounting can equally comprise the payment of funds to the provider of the PTM service, where the payment tariff preferably increases with an increasing indicated number of subscribers. In both cases, providing a successful PTM service that attracts a large number of subscribers provides financial advantages to the service provider.

It may be noted that the principle of "less expensive if successful" can also be applied to billing the subscribers of the service.

In the following preferred examples of the present invention shall be described in detail, in order to provide the skilled person with a thorough and complete understanding of the invention, but these detailed embodiments only serve as examples of the invention and are not intended to be limiting. The following description shall make reference to the enclosed drawings, in which.

DETAILED DESCRIPTION OF EMBODIMENTS

Figure 1:
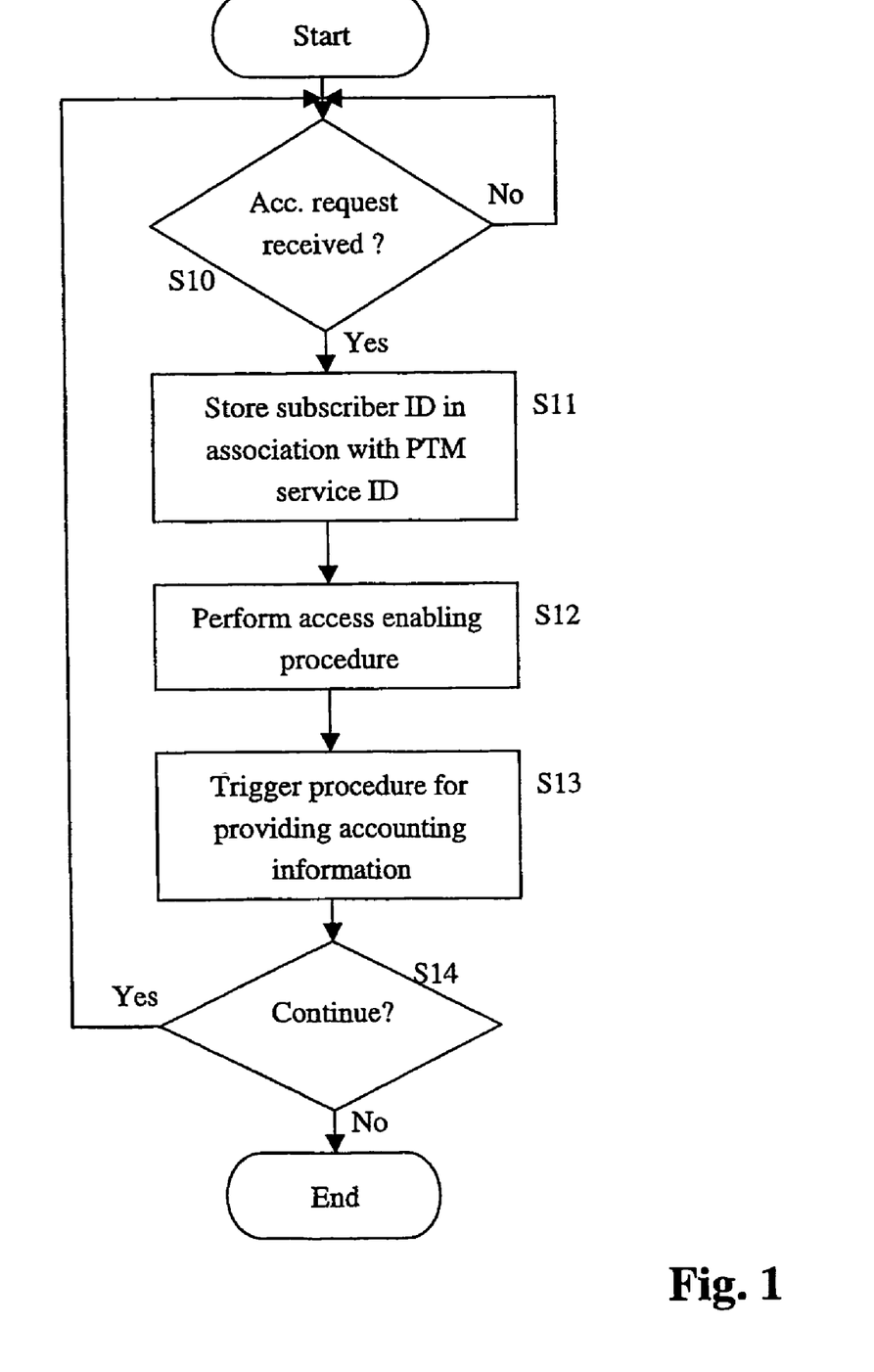
FIG. 1 shows a flowchart of a basic embodiment of the present invention.

FIG. 1 shows a flow chart of an example of a method according to the present invention.

In a PTM service managing entity of the mobile communication network, it is determined in a step S10 whether a request for accessing a PTM service has been received from a mobile station interacting with the mobile communication network. The PTM service managing entity is preferably a centralised entity for handling all such PTM service access requests in the network.

It should be noted that the term "entity" or "network entity" in the context of the present application refers to any suitable combination of hardware or software for providing a predetermined functionality in the mobile communication network. In this way, the term generally refers to a logical entity that can be spread out over several physical nodes of the networks, but can also refer to a physical entity located in one physical node.

Preferably, the mobile communication network is capable of data unit based communication, i.e. is capable of packet-switching, e.g. is a network operating according to GPRS (General Packet Switched Radio) or UMTS (Universal Mobile Telephone System). Thereby, both multicast and broadcast services can be provided. However, the present invention is also applicable in the context of circuit-switched mobile communication networks, in which case the available PTM services would be broadcast services.

A request for accessing a PTM service comprises a subscriber identifier of the subscriber placing the request, and a PTM service identifier of the PTM service for which access is being requested. The identifiers can have any form suitable for the mobile communication network implementing the invention, e.g. the subscriber can be identified by an IMSI (International Mobile Subscriber Identity), temporary subscriber identity or any other known system of identifying subscribers, and the PTM services can be identified in a similar way, e.g. by a unique numbering scheme used by a plurality of networks, by a temporary numbering scheme used within the mobile communication network under consideration, or any other suitable scheme.

Returning to FIG. 1, it can be seen that step S10 is conducted until a request is received. If a request is received, the procedure proceeds to step S11, in which a suitable subscriber identification for the subscriber placing the request is stored in association with a suitable PTM service identification for the requested PTM service. It may be noted that the identifications stored in association with one another can be the same identifiers as received in the request or can be identifiers provided according to a different scheme. Namely, it is possible that the PTM service managing entity processes the subscriber identifier and PTM service identifier received in the request, in order to convert these identifiers into a different format for storage.

The association between the subscriber identification and the PTM service identification can be provided in any suitable or desirable way, e.g. by known database linking techniques. In other words, the storing of the subscriber identifications and the PTM identifications in association with one another can be accomplished in accordance with any known database technology. Preferably, the PTM service managing entity is a centralized database for the mobile communication network.

Subsequent to the storage, an access enabling procedure S12 is performed. The access enabling procedure conducted by the PTM service managing entity places the network and/or mobile station requesting the PTM service into a condition such that the mobile station can access the PTM service, i.e. receive the transmissions of the service and correctly reproduce the contents thereof. For example, the access and enabling procedure can consist in the PTM service managing entity informing a server that provides a multicast service that the subscriber who sent the request has joined the appropriate multicast group, such that the server will commence sending transmissions to said subscriber. As another example, the access enabling procedure can consist in providing the requesting subscriber with the appropriate decryption key for decryption the transmissions of a desired broadcast transmission.

Subsequent to step S12, the method of FIG. 1 proceeds to step S13, in which a procedure for providing accounting information to an accounting entity of the mobile communication network is started. Accounting for the PTM service is performed with respect to one or more subscribers of the PTM service and/or the provider of the PTM service, where the provided accounting information identifies the subscriber who place the request together with the PTM service for which access was requested.

The providing of the accounting information can be performed in any desirable or suitable way. For example, the providing of the accounting information can consist in a single message from the PTM service managing entity to the accounting entity, in which the subscriber and PTM service are identified. Namely, if the accounting (charging or payment) only depends on a PTM service being accessed, regardless of how long it is being accessed, then the corresponding accounting does not require more than such a single message. Preferably, the providing of the accounting information is done in such a way that the accounting entity also receives information on how long a given PTM service is being accessed by a given subscriber. This can be accomplished in a number of ways, e.g. by measuring the length of time that a subscriber is stored in association with a PTM service, or the length of time that the user identification is stored in association with a given PTM service and this given PTM service is active. This in turn can be accomplished by operating one or more timers in the PTM service management entity, but can also be accomplished by one or more timers in the accounting entity. Namely, according to a preferred embodiment, the providing of accounting information is conducted in such a way that the PTM service management entity sends accounting information messages at regular intervals as long as a given subscriber is stored in association with a given PTM service, or as long as a given subscriber is stored in association with an active PTM service. In this way, the accounting entity can perform an appropriate accounting procedure (e.g. debit the subscribers account by a predetermined amount) for every received accounting information method.

It should be noted that the identifying of the subscriber and PTM service in the accounting information can be done in any suitable or desirable way, e.g. by communicating the identifiers contained in the initial access request and/or the identifications stored in association with one another and/or any other suitable form of identification recognisable by the accounting entity.

Returning to FIG. 1, in a step S14, it is decided whether to continue the procedure or not, where in the event of continuing, the procedure branches back to step S10, and otherwise the procedure comes to an end.

Although, FIG. 1 shows a general example, it should be noted that the present invention is by no means restricted thereto. For example, the steps can also be performed in a different sequence, as e.g. steps S11 and S12 can be inverted or performed in parallel, especially if these steps are respectively performed in different physical entities.

According to a preferred embodiment, the accounting information provided to the accounting entity indicates a present number of subscribers, where said indicated number corresponds to all or a predetermined part of subscribers, currently stored in association with the PTM service. For example, the predetermined part of the subscribers can be all subscribers in a predetermined region. The "region" in this context can be a physical region, such as all the subscribers currently located in a specific cell of a cellular network, in a routing area or in a location area, or the region can be a logical region, such as a predetermined address area or address range. Equally, a predetermined part of the subscribers could be defined in terms of different subscription categories, e.g. only the number of subscribers is indicated who have a predetermined kind of subscription. This can be accomplished by providing an interface between the PTM service managing entity and a subscriber database in the mobile communication network (e.g. a home location register or similar entity), such that the PTM service management service may collect such subscriber specific information and provide it to the accounting entity.

Preferably, the accounting entity then performs the accounting in dependence on the indicated number of subscribers. For example, if the accounting comprises billing (debiting the account), then the applied billing tariff can decrease with an increasing indicated number of subscribers. As another example, if the accounting comprises payment (crediting the account), then a payment tariff can increase with the increasing indicated number of subscribers. In other words, the accounting is conducted according to the principle of "less expensive if successful" or "more profitable if successful". The application of this principle can also be limited to certain subscribers and/or certain service providers, i.e. the change in tariffs depending on the number of indicated users is only applied to selected subscribers and/or selected service providers. Such limitations to selective subscribers and/or selected service providers can be accomplished by providing an interface between the PTM service managing entity and the subscriber database in the mobile communication network, such that the PTM service management service may collect such subscriber specific information and provide it to the accounting entity. Alternatively such an interface can be arranged between the accounting entity and the subscriber database, and the accounting entity collects the appropriate subscriber information and/or service provider information, in order to perform the selective accounting.

The procedure for adapting the billing or payment tariff on the basis of the indicated number of subscribers can be performed in any suitable or desirable way, e.g. by comparing the indicated number with a pre-defined or configurable threshold, where a first tariff is used if the number is below the threshold, and a second tariff is employed if the threshold is exceeded. For example, the second tariff can be a zero tariff, so that no charge is billed if the threshold is exceeded. It is equally possible to provide more than one threshold, where the plurality of thresholds defines ranges of subscriber numbers, and each range is associated with its corresponding tariff.

According to another embodiment of the invention, the accounting is also performed on the basis of the amount of data transported. If the accounting comprises billing, it is possible that the billing is performed differently for data transported from the mobile communication network to the mobile station (in the downlink direction) than for data transported from the mobile station to the mobile communication network (in the uplink direction). More specifically, it is possible that charging or billing is only performed for data transported in the uplink direction or in the downlink direction. For example, if the uplink direction is only used for signalling, i.e. not for content transport, then it is possible that charging only takes place for the downlink direction.

In order to perform accounting on the basis of the amount of data transported, the network entities responsible for data transport will generally send corresponding accounting information messages to the accounting entity, where said accounting information messages indicate the amount of transported data and the subscribers and/or service providers involved in the communication. In order to provide accounting dependent on the direction of data transport, it is possible to control the network entities handling the data transport in such a way so that they only produce accounting information messages for traffic in one of the directions, or the accounting entity is controlled in such a way that accounting information messages pertaining to traffic in a specified direction (e.g. the uplink direction) are ignored in the accounting procedure.

Figure 2:
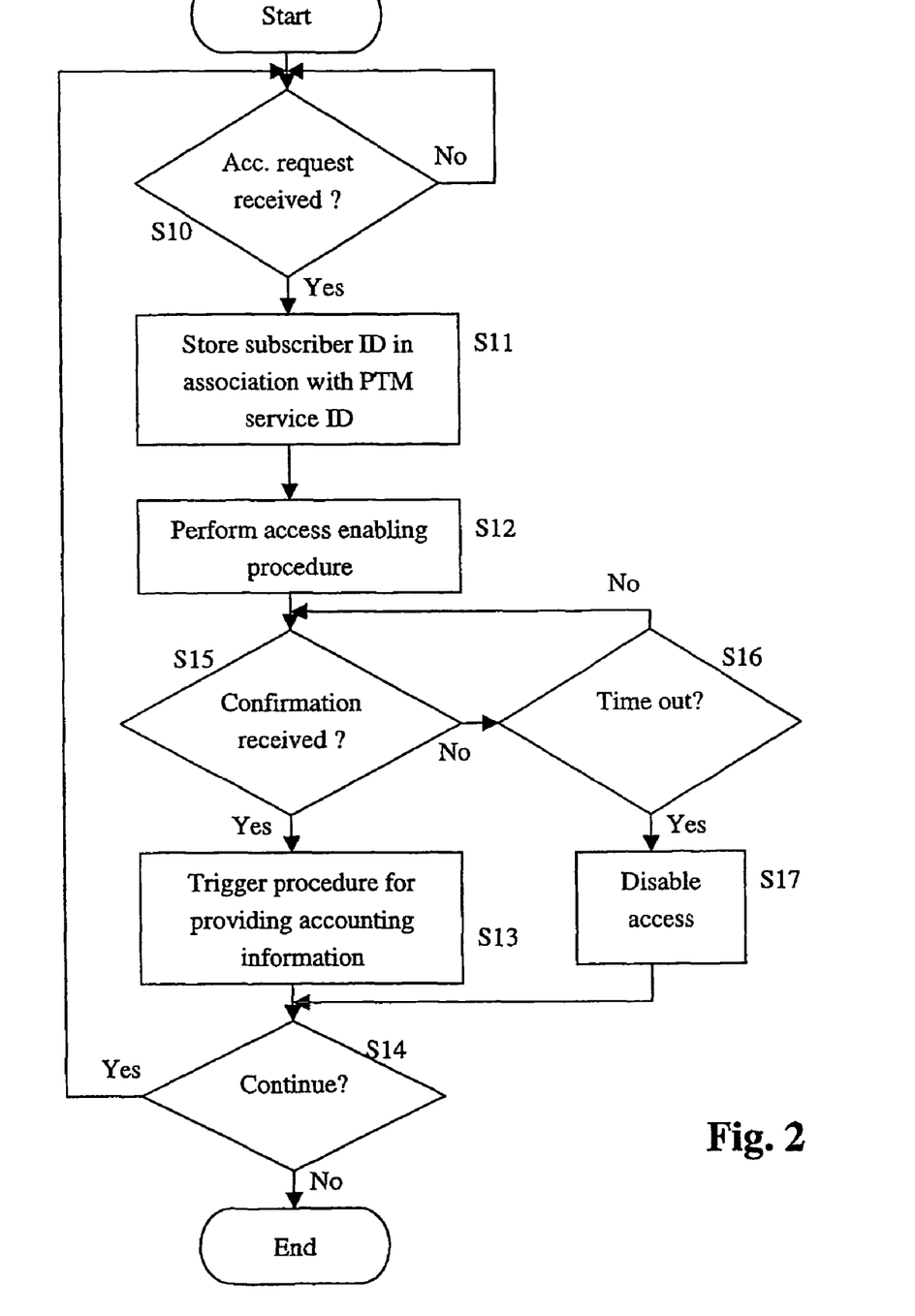
FIG. 2 shows a flowchart of another embodiment of the invention.

FIG. 2 shows a flowchart for a method according to a further embodiment of the present invention. The method shown in FIG. 2 is a variation of the method shown in FIG. 1, where the steps S10 to S14 described in connection with FIG. 1 are also used in the method of FIG. 2, such that a description of these steps shall not be repeated. In addition to the steps of FIG. 1, the method of FIG. 2 comprises a step S15 subsequent to step S12 (the access enabling step), where step S15 determines whether an access confirmation has been received, e.g. from the mobile station from which the access request was sent or from some other entity involved in the service provision. If no access confirmation has been received, the procedure branches to step S16, in which it is determined whether a predetermined amount of time has expired, and if not, then the procedure branches back to step S15. If the predetermined amount of time has expired, then the procedure goes to step S17, in which an access disabling procedure is performed, whereupon the procedure proceeds to step S14. On the other hand, if step S15 determines that an access confirmation has been received from the mobile station, and then the procedure continues with step S13, i.e. triggers the procedure for providing accounting information.

The access disabling of step S17 is performed in accordance with type of PTM service being accessed, and will generally comprise performing the inverse operation of the access enabling procedure. For example, if the PTM service is a multicast service, then the association between the subscriber identification and the PTM service identification is deleted, and the server originating transmissions is informed that the given subscriber has been removed from the multicast group.

In summary, the additional steps S15, S16 and S17 as described above in conjunction with FIG. 2 mean that it is waited for the receipt of a service access confirmation, and the accounting information is only provided to the accounting entity if the service access confirmation is received.

Therefore, the subscriber has the possibility of accepting or rejecting the access to the desired PTM service even after having sent the initial access request. It may be noted that the access confirmation could be sent directly from the mobile station to the PTM service management entity or could be provided via or by any other entity involved in the providing of the PTM service, e.g. by the server that is sending data to the mobile station as a part of the PTM service, or an intermediate proxy server.

According to another embodiment of the present invention, a classification of PTM services into categories is provided, where the accounting information identifies the category of a PTM service and the accounting for the PTM service in the accounting entity is performed depending on the identified category. Such a classification of PTM services could be stored in the PTM service management entity, or in a separate database in the network. In the latter case, the PTM service management entity will interface with the database containing the classification, in order to obtain this classification information. Alternatively, the accounting entity could interface with the database storing the classification information, in order to obtain the appropriate data. In this way, different modes of charging or payment can be used for different categories of PTM services. The classification of services can be performed in any desirable or suitable way, e.g. on the basis of the content provided by the individual PTM service. Alternatively or additionally a classification can also be performed on the basis of network efficiency criteria. For example, it is possible that certain multicast services will be implemented in a more resource efficient way than others, such that the subscribers or users of the resource efficient multicast service are charged less than the subscribers or users of the less efficient service.

According to another embodiment of the invention, the PTM service management entity stores one or more counter values in association with a stored subscriber identification and/or PTM service identification. The one or more counter values can directly or indirectly be used in connection with the accounting for each subscriber and/or PTM service provider. Namely, the counter values can be included in the accounting information sent to the accounting entity, such that the counter values can directly be processed by the accounting entity, or the procedure for providing the accounting information from the PTM service management entity to the accounting entity can be made dependent on the one or more counter values, in order to indirectly influence the accounting.

For example, a time counter value can be associated with each stored subscriber identification in the PTM service management entity, which time counter value indicates the time period that has passed since receiving a request from the subscriber. This time counter value can e.g. be used in such a way that the sending of accounting information messages from the PTM service management entity to the accounting entity only commences after the time counter value has reached a certain value, i.e. a certain period of time has elapsed, such that a limited period of non-accounted PTM service access is provided. For example, this means that the subscriber may view transmissions associated with the PTM service for a limited time without being charged. As an option, this period of time can be made dependent on the subscription of each individual user. In this case an interface should be provided such that the PTM service management entity can retrieve the appropriate information from a subscriber database.

Alternatively or in addition to the time counter value associated with each stored subscriber, a time counter that is associated with each stored PTM service identification can be supported, which e.g. indicates the time period that has passed since receiving a first request identifying said PTM service, or which indicates the time that has passed since the start of the service. This "start" can be defined in any suitable or desirable way, e.g. when the service becomes active, i.e. when a specific transmission commences. Similar to the preceding case, this time counter value related to the PTM service can be used in such a way that the sending of accounting information messages from the PTM service management entity to the accounting entity only commences after a fixed or configurable period of time has expired, such that a non-accounted period is provided for all subscribers to the given service. However, in contrast to the preceding case, this non-accounted period is the same for all subscribers, such that the first subscriber benefits the most.

As already mentioned, the time counter value associated with each stored subscriber and/or the time counter value associated with each PTM service can also be included in the accounting information sent to the accounting entity, such that the accounting entity is able to determine the charging or payment taking into consideration the indicated time periods.

In any case, it is preferable that the time periods associated with the time counter values are configurable, such that the operator of the system can adjust a non-accounted period.

Alternatively or in addition to the keeping of a time counter value, it is also possible to keep an event counter value, associated with each stored subscriber and/or with each stored PTM service. Again, the event counter value can be used directly (i.e. communicated to the accounting entity) or indirectly (used in conjunction with the providing of accounting information by the PTM service management entity). An "event" can be defined in any suitable or desirable way and e.g. consist in the delivery of a limited piece of content, e.g. a video clip. The difference with regard to using a timer value is that the period of non-accounting is not defined by a length of time, but by a number of such events.

As already specified before, the access enabling procedure performed in step S12 of FIGS. 1 and 2 may comprise sending an enable signal to a service provision control entity in or outside of the mobile communication network. For example, if the PTM service is a multicast service, then the access enabling procedure can consist in informing the source server of transmissions for the service that the subscriber has joined the appropriate multicast group, such that said server will address transmissions to said subscriber. It may be noted that such a server can be part of the mobile communication network or can be an outside server. Equally, the enable signal can also be sent to a routing entity in the mobile communication network, in which a branching of the point-to-multipoint dataflow to the subscriber is handled.

Alternatively or additionally, the access enabling procedure can comprise sending one or more decryption keys to the mobile station from which the request for accessing the PTM service was sent. In other words, this applies to the case where the PTM service comprises the transmission of encrypted content, such that a reproduction of the content requires one or more appropriate decryption keys.

An individual decryption key can be provided in dependence on a number of criteria. For example, it is possible that there is one decryption key for a PTM service, such that this key is provided to all subscribers for that TPM service. This might involve an interface between the PTM service management entity and a source server for the PTM service, in order to retrieve the appropriate key.

Alternatively or in addition, an individual decryption key may also be related to the individual subscriber. In this case, it might be necessary to provide an interface between the PTM service management and a subscriber database (e.g. a home location register HLR), in which such subscriber related keys may be stored.

Furthermore, it is equally possible that an individual decryption key is associated with each pair of a subscriber and a PTM service stored in association with one another in the PTM service management entity.

According to a preferred embodiment, the one or more decryption keys are not set beforehand, but are generated dynamically in response to receiving a request for accessing a PTM service. In other words, after a subscriber has requested access to a given PTM service, a procedure is conducted for generating one or more encryption keys for said subscriber and service. This procedure can also involve the generation of corresponding encryption keys. The decryption key or keys are provided to the mobile station, whereas the encryption key or keys are provided to the server originating the PTM service transmissions. The one or more keys can be generated at the PTM service management entity, but could equally well be generated at the source of the PTM service (e.g. the source server originating the transmissions associated with the PTM service), or in a subscriber database.

With respect to FIGS. 3 to 7, schematic signalling examples associated with the above-described embodiments shall be presented. In all of these FIGS. 3 to 7, reference numeral 31 refers to a mobile station, reference numeral 32 to a traffic handling entity in the mobile communication network, reference numeral 33 to a server providing transmissions for a PTM service, reference numeral 34 to the PTM service management entity, reference numeral 35 to a centralised network management entity for the mobile communication network, and reference numeral 36 refers to the accounting entity.

Furthermore, in all FIGS. 3 to 7, the mobile station 31 first sends a request 301 to the traffic handling entity 32, from where the request 302 is forwarded to the PTM service management entity 34. This request 301, 302 comprises a subscriber identifier of the subscriber placing the request and a PTM service identifier of the desired service.

Figure 3:
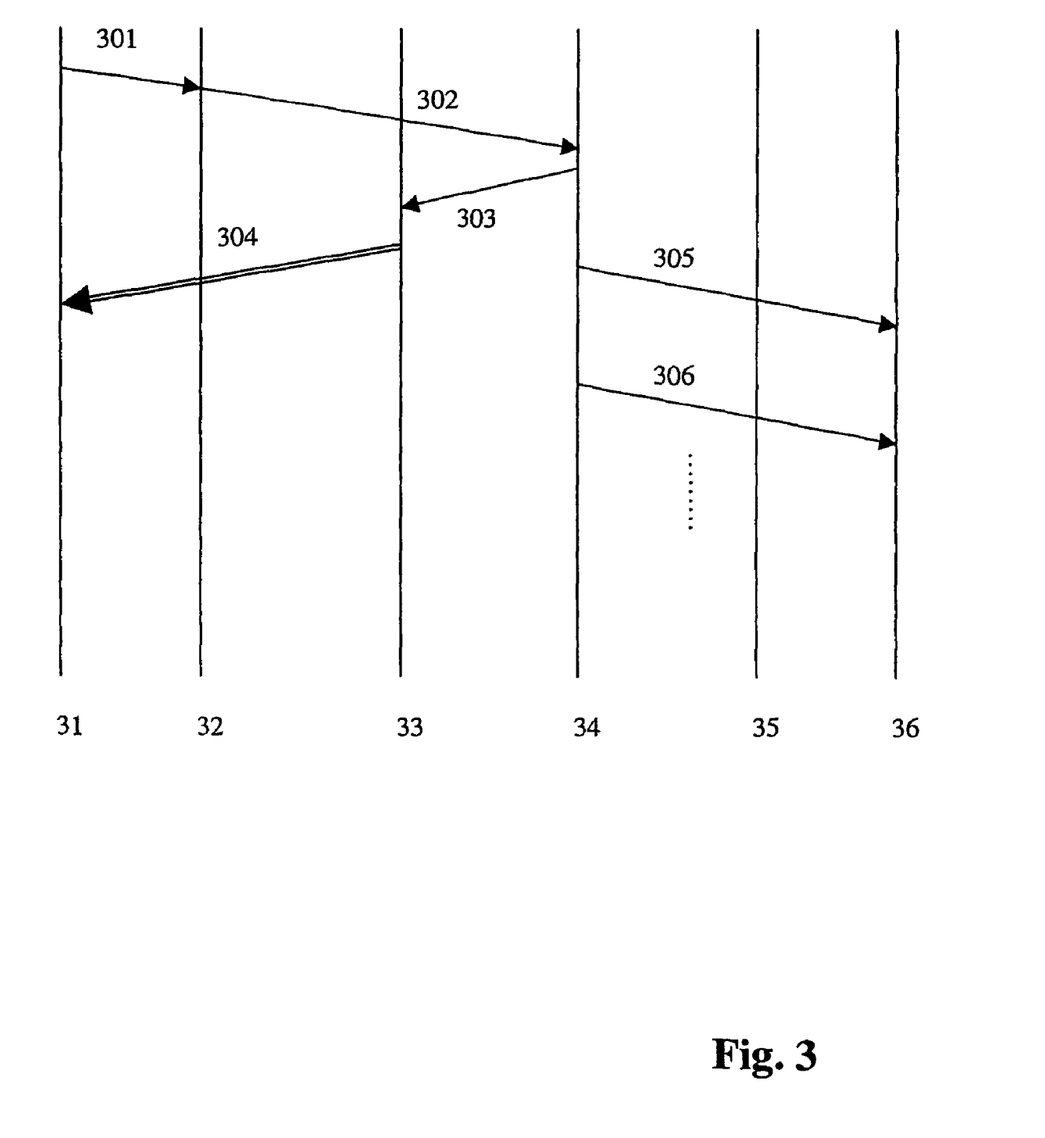
FIG. 3 shows a schematic representation of signalling according to an embodiment of the invention.

In the example of FIG. 3, which relates to the case where the PTM service is a multicast service, the PTM service management entity 34 first stores the subscriber ID in association with the PTM service ID (not shown in FIG. 3) and then sends a message 303 to the PTM source server 33, in order to enable the transmission of data to the mobile station 31, which is indicated by arrow 304. In other words, as an access-enabling step (see S12 in FIGS. 1 and 2), the enabling message is sent. Thereafter, accounting information messages 305, 306 are sent in regular intervals from the PTM service management entity 34 to the accounting entity 36, where the dots at the bottom of the arrow 306 indicate the continued transmission of these accounting information messages as long as the given subscriber identification is stored in association with the PTM service identification.

Figure 4:
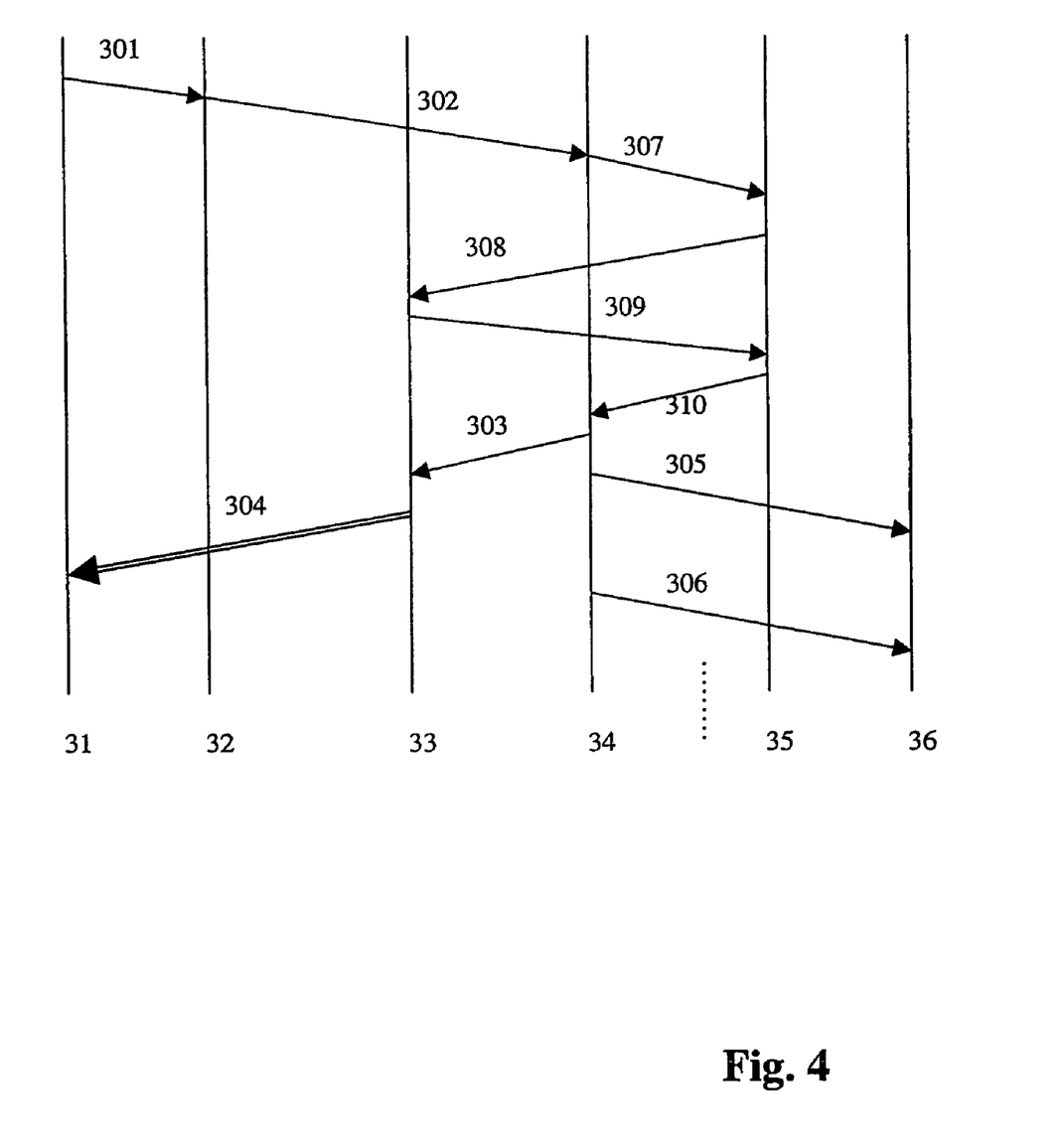
FIG. 4 shows a schematic representation of signalling according to another embodiment of the invention.

FIG. 4 shows an example, in which the request 301, 302 is the first request for a PTM service, such that the PTM service management entity 34 does not yet have a record for this service. Therefore, the PTM service management 34 sends a message 307 to the network management entity 35, which contacts the originating server 33 via a message 308, e.g. in order to appropriately configure the desired PTM service. The completion of configuration is signalled to the network management entity 35 via message 309, whereupon the network management entity 35 sends a message 310 to the PTM service management entity 34, such that an appropriate record can be initiated. The following messages 303 to 306 are the same as already explained in conjunction with FIG. 3, such that a repeated explanation is not necessary.

Figure 5:
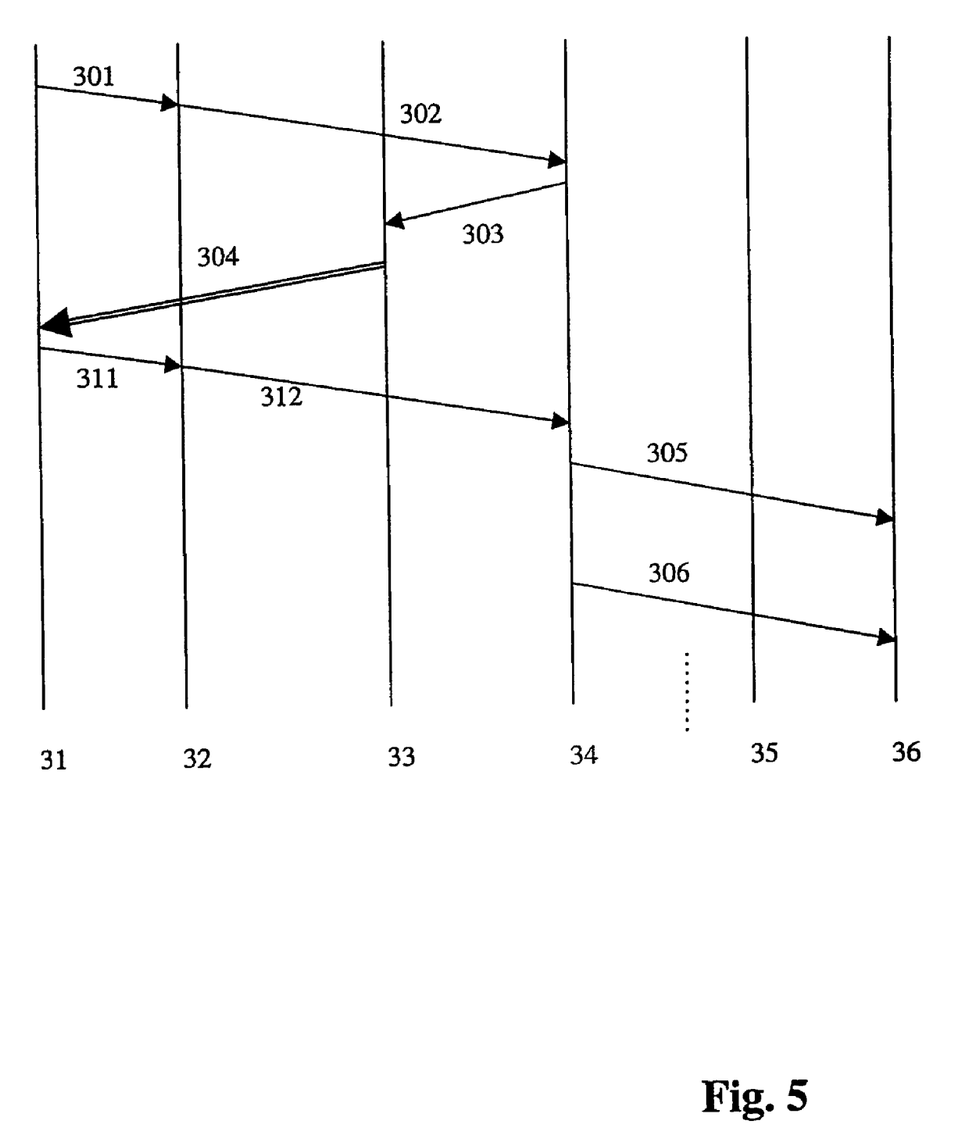
FIG. 5 shows a schematic representation of signalling according to another embodiment of the invention.

In FIG. 5 signalling is shown for an example corresponding to the embodiment of FIG. 2, in which an access confirmation message 311, 312 is sent from the mobile station 31 to the PTM service management entity 34. The remaining messages 301 to 306 are like in FIGS. 3 and 4, such that a repeated description is not necessary.

Figure 6:
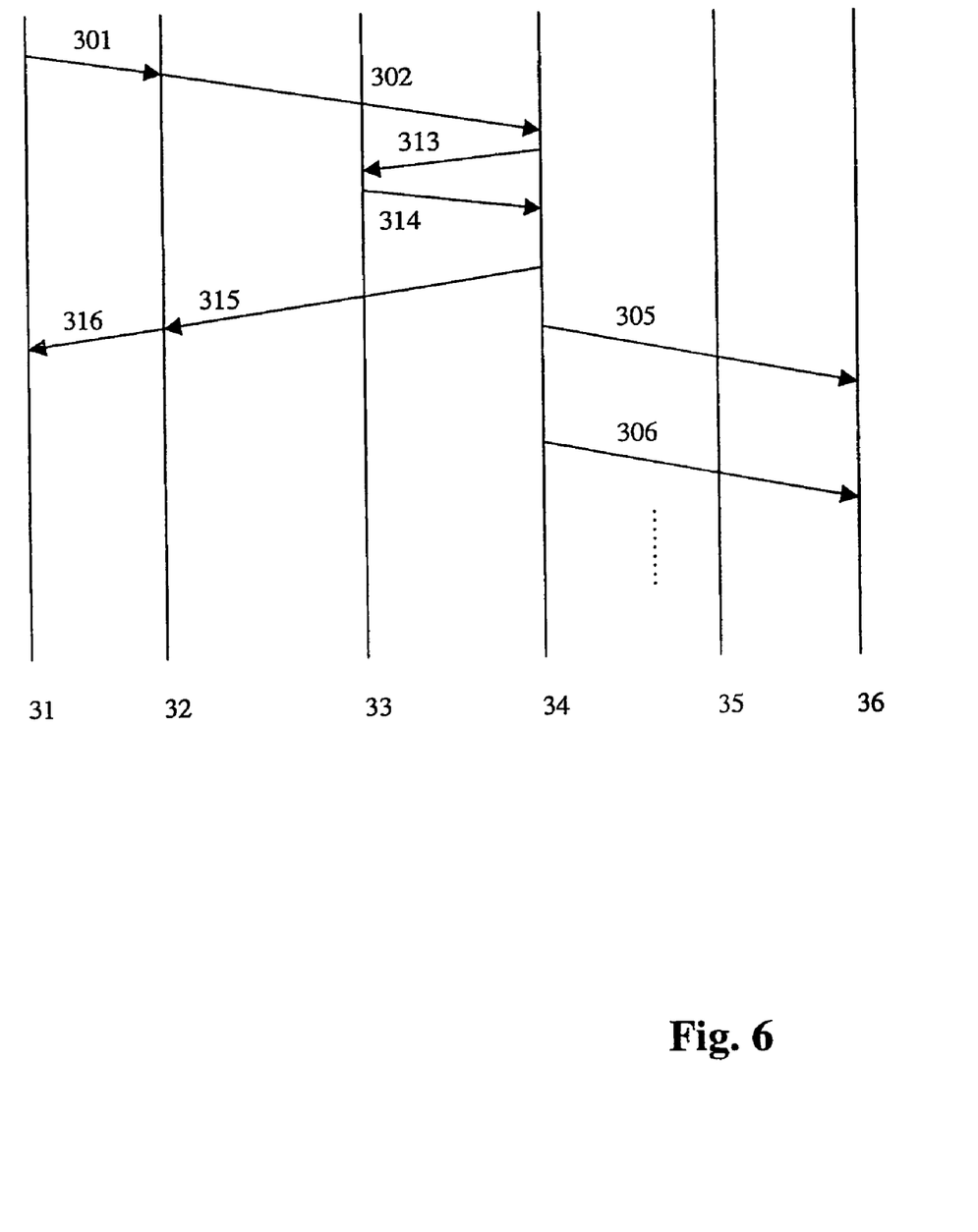
FIG. 6 shows a schematic representation of signalling according to another embodiment of the invention.

In the example of FIG. 6, a case is assumed where the access enabling procedure comprises sending a decryption key. In response to receiving the request and storing the subscriber ID in association with the PTM service ID, the PTM service management entity 34 sends a request 313 to the service-originating server 33, in order to obtain the decryption key for the transmissions of the PTM service. In other words, it is assumed that there is one key for all users of the service. The service-originating server 33 responds by transmitting the key in a message 314, which is then forwarded to the mobile station 31 via messages 315, 316. As an option, the PTM service managing entity also stores this key in association with data record of the subscriber ID and service ID stored in association with one another.

Figure 7:
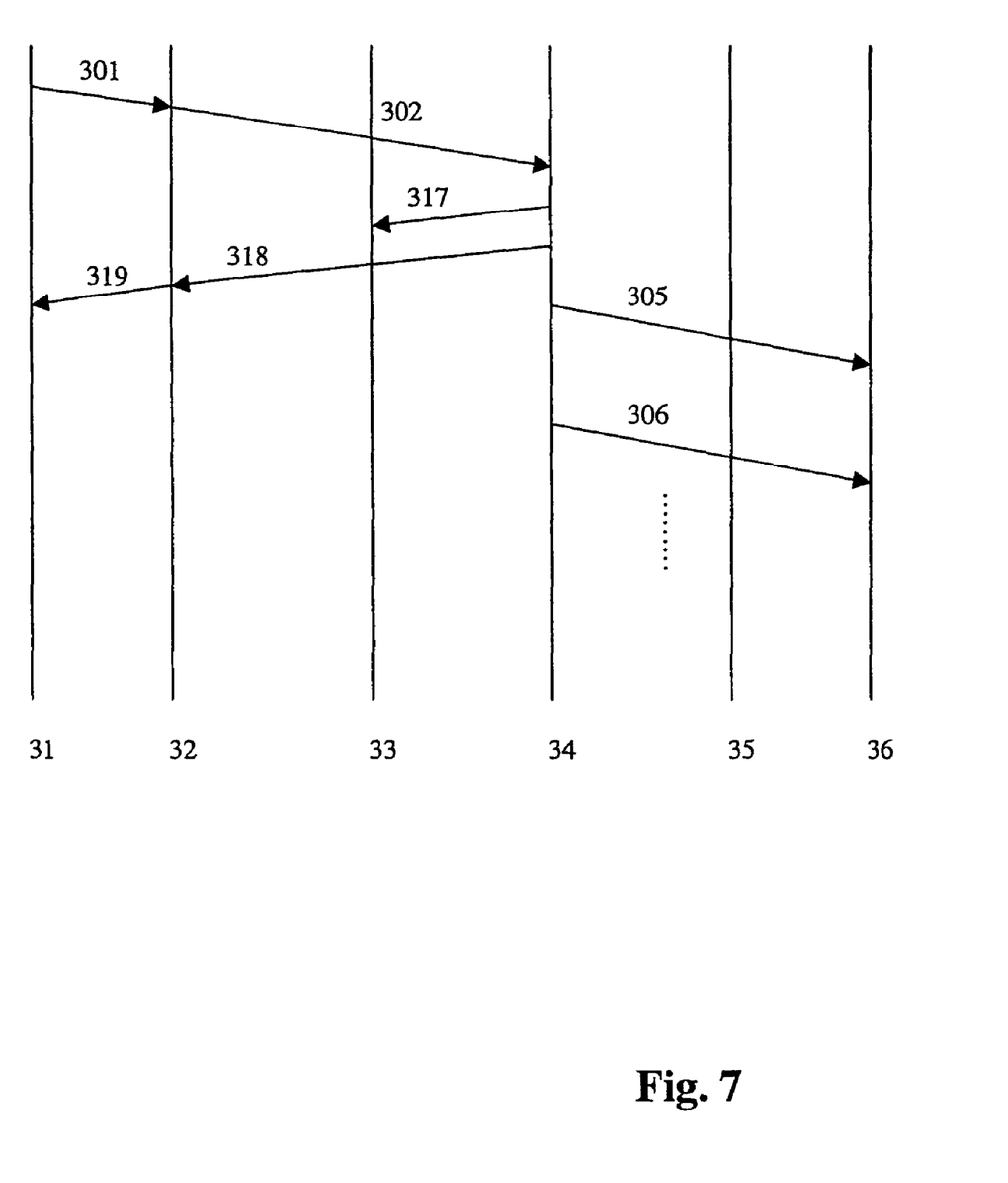
FIG. 7 shows a schematic representation of signalling according to another embodiment of the invention.

Finally, FIG. 7 relates to an example in which the PTM service management entity 34 generates a decryption key in response to receiving the PTM service access request 301, 302. Namely, a decryption key and matching encryption key are generated, and a message 317 is sent to the service originating server 33, which message 317 contains the encryption key, whereas the decryption key is sent to the mobile station 31 via messages 318, 319.

As already indicated previously, the above-described examples of the present invention can be embodied in the form of hardware, software or any appropriate combination of hardware and software. As such, the present invention can also be embodied by a computer program arranged to carry out the appropriate method steps when loaded into and executed in a data processing device communicatively connected to the mobile communication network.

Figure 8:
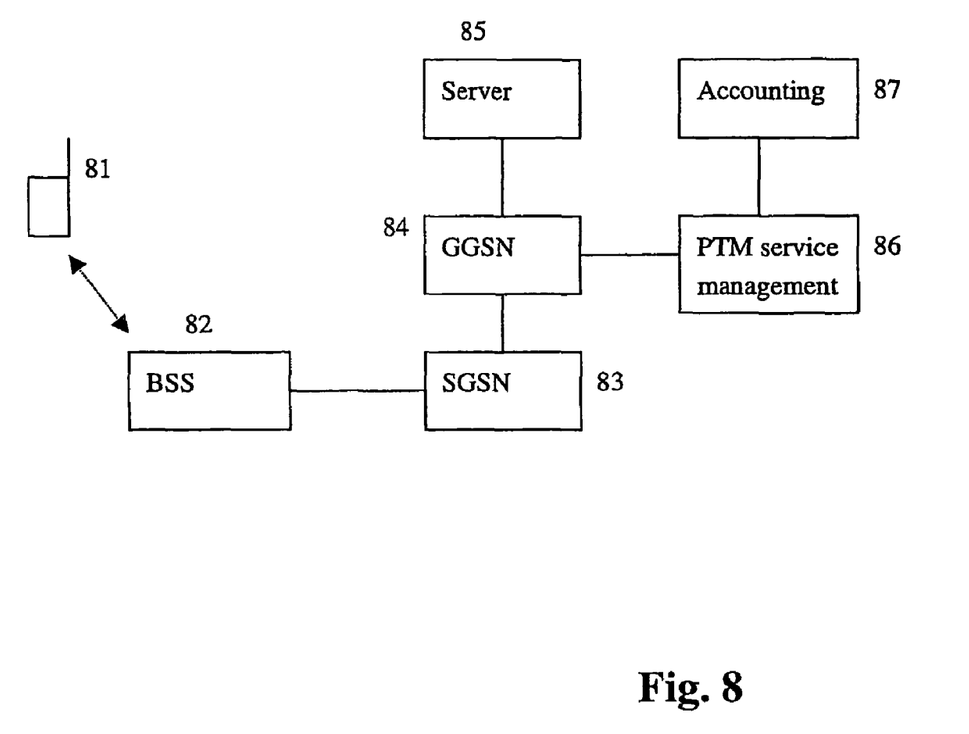
FIG. 8 shows a block diagram of network entities in which the present invention can be implemented.

FIG. 8 shows an example of the arrangement of some of the network entities described above, in the context of a mobile communication network operating according to GPRS (General Packet Radio Service) or UMTS (Universal Mobile Telephone System). Reference numeral 81 refers to a mobile station, which communicates with a base station subsystem (BSS) 82. The BSS 82 is connected to a serving GPRS support node (SGSN), which may be connected to a plurality of further base station subsystems (not shown). The SGSN 83 is connected to a gateway GPRS support node (GGSN) 84, which constitutes an. interface between the SGSN 83 and other sections of the mobile communication network, such as a network management section. The example of FIG. 8 furthermore shows a server 85 from which PTM transmissions can originate, a data base 816, which can serve as a PTM service management entity, and an accounting entity 87. It may be noted that the accounting entity 87 can consist of a gateway from the mobile communication system to an accounting computer system that serves more than one communication network. In this case "accounting entity" described above comprises the gateway and underlying computer system. With respect to FIGS. 3 to 7 it can be seen that mobile station 81 is an example of entity 31, GGSN 84 is an example of entity 32, server 85 is an example of entity 33, data base 86 is an example of the PTM service management entity 34, and the accounting entity 87 is an example of entity 36.

Although the example of FIG. 8 relates to GPRS or UMTS, it should be understood that the present invention can be applied in the context of any mobile communication system that is capable of providing point-to-multipoint services.

According to a preferred embodiment of the invention, the PTM service management entity 34 or 86 is arranged such that it comprises a receiver for receiving from a mobile station a request for accessing a PTM service, said request comprising a subscriber identifier of the subscriber placing the request and a PTM service identifier of the PTM service for which access is being requested, a memory for storing a subscriber identification for the subscriber placing the request in association with a PTM service identification for the PTM service for which access is being requested, and a processor for providing accounting information to an accounting entity, where the accounting information identifies the subscriber who placed the request together with the PTM service for which access was requested. The processor may also be arranged to perform an above described access enabling procedure.

Furthermore, according to an embodiment of the invention, the accounting entity 36 or 87 is preferably arranged in such a way that it comprises a receiver for receiving accounting information, e.g. sent by a PTM service management entity, and a processor for performing accounting for the PTM service identified in the accounting information, with respect to one or more subscribers of the PTM service and/or the provider of the PTM service, where the processor is arranged to conduct a procedure such that if the accounting information indicates a number of subscribers corresponding to all or a predetermined part of the subscribers currently stored by the PTM service management entity in association with the PTM service, the accounting depends on the indicated number of subscribers.

Although the present invention has been described in the context of detailed examples, these only serve to provide the skilled person a thorough and complete understanding and are not intended to limit the present invention, which is defined by the appended claims. Furthermore, reference signs in the claims only serve to make the claims easier to understand, and are not intended to be limiting.

The invention claimed is:

1. A method of managing point-to-multipoint services in a mobile communication network, said method comprising:
   receiving from a mobile station a request for accessing a point-to-multipoint service, said request comprising a subscriber identifier of the subscriber placing the request and a point-to-multipoint service identifier of the point-to-multipoint service for which access is being requested,
   defining accounting information associating said subscriber identifier with said point-to-multipoint service identifier;
   storing said accounting information placing the subscriber in association with the identified point-to-multipoint service within a point-to-multipoint (PTM) service management entity;
   performing an access enabling procedure, and
   providing said accounting information to an accounting entity of said mobile communication network in which charging data for the point-to-multipoint service is provided considering a total number of subscribers who placed the request for accessing the point-to-multipoint service and a provider of the point-to-multipoint service, said accounting information identifying the subscriber who placed the request together with the point-to-multipoint service for which access was requested, wherein said charging data is used for billing the provider of the point-to-multipoint service depending on the number of the subscribers receiving the service.

2. The method of claim 1, wherein in addition to identifying said point-to-multipoint service, said accounting information indicates a number of subscribers, said indicated number corresponding to all or a predetermined part of the subscribers currently stored in association with said point-to-multipoint service.

3. The method of claim 2, wherein said accounting information depends on the indicated number of subscribers.

4. The method of claim 3, wherein said accounting information comprises billing and a billing tariff decreases with an increasing indicated number of subscribers.

5. The method of claim 3, wherein said accounting information comprises payment and a payment tariff increases with an increasing indicated number of subscribers.

6. The method of claim 1, wherein said accounting is also performed on the basis of the amount of data transported.

7. The method of claim 6, wherein said accounting is performed differently for data transported from the mobile communication network to the mobile station than for data transported from the mobile station to the mobile communication network.

8. The method of claim 7, wherein billing is only performed for data transported from the mobile communication network to the mobile station or performed for data transported from the mobile station to the mobile communication network.

9. The method of claim 1, wherein after performing said access enabling procedure,
   waiting for the receipt of a service access confirmation, and said accounting information is only provided to said accounting entity if said service access confirmation is received.

10. The method of claim 1, wherein the subscriber identifications and associated point-to-multipoint service identifications are stored in a centralized point-to-multipoint service data base for said mobile communication network.

11. The method of claim 1, wherein a classification of point-to-multipoint services into categories is provided, said accounting information identifying the category of the point-to-multipoint service, and said accounting of the point-to-multipoint service is performed depending on the identified category.

12. The method of claim 1 further comprising:
   storing one or more counter values in association with said stored subscriber identification and/or point-to-multipoint service identification.

13. The method of claim 12, further comprising:
   providing said one or more counter values as a part of said accounting information.

14. The method of claim 13, wherein said one or more counter values comprise one or more of the following:
   a time counter value associated with said stored subscriber identification, indicating a time period that has passed since receiving said request from said subscriber,
   a time counter value associated with said stored point-to-multipoint service identification, indicating a time period that has passed since receiving a first request identifying said point-to-multipoint service,
   an event counter value associated with said stored subscriber identification, indicating a number of predetermined events that have occurred since receiving said request from said subscriber, and
   an event counter value associated with each stored point-to-multipoint service identification, indicating a number of predetermined events that have occurred since receiving said first request identifying said point-to-multipoint service.

15. The method of claim 1, wherein said access enabling procedure comprises:
   sending an enable signal to a service provision control entity.

16. The method of claim 1, wherein said access enabling procedure comprises:

sending one or more decryption keys to the mobile station from which the request for accessing said point-to-multipoint service was sent.

17. The method of claim 16, wherein an individual decryption key is provided in dependence on one or more of:
   each stored subscriber identification,
   each stored point-to-multipoint service identification, and
   each pair of a subscriber identification and point-to-multipoint service identification stored in association.

18. The method of claim 16, wherein said one or more decryption keys are generated dynamically in response to receiving said request for accessing a point-to-multipoint service.

19. A non-transitory computer readable medium storing a computer program, the computer program for managing point-to-multipoint services in a mobile communication network, the computer program comprising:
   instructions for receiving from a mobile station a request for accessing a point-to-multipoint service, said request comprising a subscriber identifier of the subscriber placing the request and a point-to-multipoint service identifier of the point-to-multipoint service for which access is being requested,
   instructions for defining accounting information associating said subscriber identifier with said point-to-multipoint service identifier;
   instructions for storing said accounting information placing the subscriber in association with the identified point-to-multipoint service within a point-to-multipoint (PTM) service management entity;
   instructions for performing an access enabling procedure, and instructions for providing said accounting information to an accounting entity of said mobile communication network in which charging data for the point-to-multipoint service is provided considering a total number of subscribers who placed the request for accessing the point-to-multipoint service and a provider of the point-to-multipoint service, said accounting information identifying the subscriber who placed the request together with the point-to-multipoint service for which access was requested, wherein said charging data is used for billing the provider of the point-to-multipoint service depending on the number of the subscribers receiving the service.

20. An accounting entity of a mobile communication network, said accounting entity comprising:
   a receiver for receiving accounting information, said accounting information identifying a subscriber placing a request for a point-to-multipoint service, and identifying a point-to-multipoint service for which access was requested wherein said accounting information further associating said subscriber identifier with said point-to-multipoint service identifier by a point-to-multipoint service data base entity; and
   a processor for providing charging data for the point-to-multipoint service identified in the accounting information considering a total number of subscribers who placed the request for accessing the point-to-multipoint service and a provider of the point-to-multipoint service and wherein said charging data is used for billing the provider of the point-to-multipoint service depending on the number of the subscribers receiving the service, wherein said processor is arranged such that if said accounting information indicates the number of subscribers corresponding to all or a predetermined part of the subscribers currently stored by said point-to-multipoint service data base entity in association with said point-to-multipoint service, said charging data depends on the indicated number of subscribers.

21. The accounting entity according to claim 20 wherein said point-to-multipoint service data base entity comprises:
   a receiver for receiving from a mobile station a request for accessing a point-to-multipoint service, said request comprising a subscriber identifier of the subscriber placing the request and a point-to-multipoint service identifier of the point-to-multipoint service for which access is being requested, and
   a processor for providing said accounting information to said accounting entity of said mobile communication network, said accounting information identifying the subscriber placing the request, together with the point-to-multipoint service for which access was requested.

* * * * *

UNITED STATES PATENT AND TRADEMARK OFFICE
CERTIFICATE OF CORRECTION

| | | |
|---|---|---|
| PATENT NO. | : 7,944,873 B2 | Page 1 of 1 |
| APPLICATION NO. | : 10/507353 | |
| DATED | : May 17, 2011 | |
| INVENTOR(S) | : Hundscheidt et al. | |

It is certified that error appears in the above-identified patent and that said Letters Patent is hereby corrected as shown below:

On the Face Page, in Field (56), under "OTHER PUBLICATIONS", in Column 2, Line 2, delete "Netwroking" and insert -- Networking --, therefor.

On Page 2, in Field (56), under "OTHER PUBLICATIONS", in Column 2, Line 7, delete "Sharng" and insert -- Sharing --, therefor.

In Column 2, Line 51, below "limiting.", insert Heading -- BRIEF DESCRIPTION OF THE DRAWINGS --.

Signed and Sealed this
Thirtieth Day of August, 2011

David J. Kappos
*Director of the United States Patent and Trademark Office*